(12) United States Patent
Zhao et al.

(10) Patent No.: US 10,127,009 B2
(45) Date of Patent: Nov. 13, 2018

(54) DATA PROCESSING METHOD AND TERMINAL THEREOF

(71) Applicant: Tencent Technology (Shenzhen) Company Limited, Shenzhen (CN)

(72) Inventors: Weifeng Zhao, Shenzhen (CN); Lingcheng Kong, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/709,807

(22) Filed: Sep. 20, 2017

(65) Prior Publication Data

US 2018/0011683 A1    Jan. 11, 2018

Related U.S. Application Data

(63) Continuation-in-part of application No. PCT/CN2016/084031, filed on May 31, 2016.

(30) Foreign Application Priority Data

Dec. 1, 2015 (CN) .......................... 2015 1 0870232

(51) Int. Cl.
*G06F 3/16* (2006.01)
*G06F 3/041* (2006.01)

(52) U.S. Cl.
CPC ............ *G06F 3/165* (2013.01); *G06F 3/0416* (2013.01)

(58) Field of Classification Search
CPC ........... G06F 3/165; G06F 3/0416; G06F 3/00
(Continued)

(56) References Cited

U.S. PATENT DOCUMENTS 8,428,936 B2 * 4/2013 Mittal ..................... G10L 19/20
704/203
2013/0173259 A1 * 7/2013 Mittal ................. G10L 19/0212
704/201

FOREIGN PATENT DOCUMENTS

CN    101231850 A    7/2008
CN    102610229 A    7/2012
(Continued)

OTHER PUBLICATIONS

Tencent Technology, ISR, PCT/CN2016/084031, dated Sep. 2, 2016, 2 pgs.
(Continued)

*Primary Examiner* — Melur Ramakrishnaiah
(74) *Attorney, Agent, or Firm* — Morgan, Lewis & Bockius LLP (57) ABSTRACT

The present application discloses a data processing method and a terminal thereof. The method includes: obtaining, in real time, target audio data from an on-line source; processing the target audio data using a first audio data processing approach and playing the processed target audio data at the terminal; while playing the processed target audio data: obtaining an audio data processing approach transition instruction, the audio data processing approach transition instruction including a second audio data processing approach and a real-time window of switching from the first audio data processing approach to the second audio data processing approach; in response to the audio data processing approach transition instruction, processing the target audio data received in the real-time window using the first audio data processing approach and the second audio data processing approach separately; and determining output audio data to be played at the terminal during the real-time window.

20 Claims, 4 Drawing Sheets

(58) Field of Classification Search
USPC .......... 700/94; 704/260, 500, 219; 381/94.5, 381/94.1; 369/124.08, 47.32
See application file for complete search history.

(56) References Cited

FOREIGN PATENT DOCUMENTS

| | | |
|---|---|---|
| CN | 103187066 A | 7/2013 |
| CN | 103794220 A | 5/2014 |
| CN | 103915100 A | 7/2014 |
| EP | 2214164 A2 | 8/2010 |

OTHER PUBLICATIONS

Tencent Technology, Written Opinion, PCT/CN2016/084031, dated Sep. 2, 2016, 3 pgs.

* cited by examiner

DATA PROCESSING METHOD AND TERMINAL THEREOF

RELATED APPLICATIONS

This application is a continuation-in-part application of PCT/CN2016/084031, entitled "DATA PROCESSING METHOD AND TERMINAL THEREOF" filed on May 31, 2016, which claims priority to Chinese Patent Application No. 201510870232.7, filed with the State Intellectual Property Office of the People's Republic of China on Dec. 1, 2015, and entitled "DATA PROCESSING METHOD AND TERMINAL THEREOF", both of which are incorporated herein by reference in their entirety.

FIELD OF THE TECHNOLOGY

The present disclosure relates to a data processing technology, and in particular, to a data processing method and a terminal thereof.

BACKGROUND OF THE DISCLOSURE

In an audio data processing process, interframe distortion often occurs because transition between audio frames is not sufficiently smooth. For example, a popping noise occurs between two audio frames. This phenomenon is caused because of different processing algorithms of two adjacent audio frames.

An existing basic method for resolving the foregoing problem is performing smoothing processing on a distorted part. For example, smoothing processing is performed on data corresponding to two different audio frames of a processing algorithm by using a low-pass filter. Specifically, a distortion location is determined; data corresponding to an audio frame before the processing algorithm is switched and data corresponding to a current audio frame are separately obtained; low-pass filtering processing is separately performed on data corresponding to an audio frame before the processing algorithm is switched and data corresponding to a current audio frame, and the processed data is placed to an original position, so as to smooth the distorted part. However, because in the foregoing method, data corresponding to an audio frame before switching is obtained, and data corresponding to a current audio frame is obtained, only off-line processing is performed. That is, entire audio data is processed after the audio data is completely recorded, and on-line processing, that is, processing while playing, cannot be performed. That is, the off-line processing manner cannot resolve interframe distortion caused because of switching of the processing algorithm in a playing process.

SUMMARY

To resolve interframe distortion in a playing process, embodiments of the present application provide a data processing method and a terminal thereof, so as to perform smoothing processing on audio data in an on-line manner, thereby improving user experience.

Technical solutions of the embodiments of the present application are implemented in this way:

An embodiment of the present application provides a data processing method, applied to a terminal, the method including:

obtaining target audio data corresponding to a data processing approach before switching when it is detected that the data processing approach needs to be switched;

performing data processing on the target audio data by using a first audio data processing approach corresponding to the data processing approach before switching, to obtain target processing data processed using the first audio data processing approach;

performing data processing on the target audio data by using a second audio data processing approach corresponding to the data processing approach after switching, to obtain target processing data processed using the second audio data processing approach; and determining output audio data to be played at the terminal during the real-time window, so that sound effects that can be achieved by the determined output audio data and expected target output audio data are consistent.

Based on the foregoing solution, the method further includes: performing attenuation processing on the target processing data processed using the first audio data processing approach, to obtain a first group of processing sub-data, where the first group of processing sub-data includes N pieces of first processing sub-data, the N pieces of first processing sub-data have a tendency to attenuate, data values of the N pieces of first processing sub-data are all less than or equal to a data value of the target processing data processed using the first audio data processing approach, and N is a positive integer greater than or equal to 2 that is determined according to a data length of the target audio data.

Based on the foregoing solution, the method further includes:

performing enhancement processing on the target processing data processed using the second audio data processing approach, to obtain a second group of processing sub-data, where the second group of processing sub-data includes N pieces of second processing sub-data, the N pieces of second processing sub-data have a tendency to increase, and data values of the N pieces of second processing sub-data are all less than or equal to a data value of the target processing data processed using the second audio data processing approach.

Based on the foregoing solution, the determining output audio data to be played at the terminal during the real-time window includes:

determining the output audio data according to a linear summation of the first group of processing sub-data and the second group of processing sub-data.

Based on the foregoing solution, the method further includes:

detecting an output manner of audio data corresponding to the data processing approach before switching; and using the corresponding audio data before switching as the target audio data when it is detected that the corresponding audio data before switching needs to perform audio output in a first manner, to perform data processing on audio data outputted in the first manner.

Based on the foregoing solution, the method further includes:

detecting an output manner of audio data corresponding to the data processing approach before switching;

when it is detected that the corresponding audio data before switching needs to perform audio output in at least two output manners, dividing the corresponding audio data before switching into at least two pieces of audio sub-data according to the at least two output manners, so that each of the at least two pieces of audio sub-data corresponds to an output manner; and using each of the at least two pieces of audio sub-data as the target audio data, to separately perform data processing on audio sub-data in different output manners.

An embodiment of the present application further provides a terminal, including:

a detection unit, configured to obtain target audio data corresponding to a data processing approach before switching when it is detected that the data processing approach needs to be switched;

a first data processing unit, configured to perform data processing on the target audio data by using a first audio data processing approach corresponding to the data processing approach before switching, to obtain target processing data processed using the first audio data processing approach;

a second data processing unit, configured to perform data processing on the target audio data by using a second audio data processing approach corresponding to the data processing approach after switching, to obtain target processing data processed using the second audio data processing approach; and a determining unit, configured to determine output audio data according to the target processing data processed using the first audio data processing approach and the target processing data processed using the second audio data processing approach, so that sound effects that can be achieved by the determined output audio data and expected target output audio data are consistent.

Based on the foregoing solution, the first data processing unit is further configured to perform attenuation processing on the target processing data processed using the first audio data processing approach, to obtain a first group of processing sub-data, where the first group of processing sub-data includes N pieces of first processing sub-data, the N pieces of first processing sub-data have a tendency to attenuate, data values of the N pieces of first processing sub-data are all less than or equal to a data value of the target processing data processed using the first audio data processing approach, and N is a positive integer greater than or equal to 2 that is determined according to a data length of the target audio data.

Based on the foregoing solution, the second data processing unit is further configured to perform enhancement processing on the target processing data processed using the second audio data processing approach, to obtain a second group of processing sub-data, where the second group of processing sub-data includes N pieces of second processing sub-data, the N pieces of second processing sub-data have a tendency to increase, and data values of the N pieces of second processing sub-data are all less than or equal to a data value of the target processing data processed using the second audio data processing approach.

Based on the foregoing solution, the determining unit is further configured to determine the output audio data according to the first group of processing sub-data and the second group of processing sub-data.

Based on the foregoing solution, the detection unit is further configured to: detect an output manner of audio data corresponding to the data processing approach before switching; and use the corresponding audio data before switching as the target audio data when it is detected that the corresponding audio data before switching needs to perform audio output in a first manner, to perform data processing on audio data outputted in the first manner.

Based on the foregoing solution, the detection unit is further configured to: detect an output manner of audio data corresponding to the data processing approach before switching;

when it is detected that the corresponding audio data before switching needs to perform audio output in at least two output manners, divide the corresponding audio data before switching into at least two pieces of audio sub-data according to the at least two output manners, so that each of the at least two pieces of audio sub-data corresponds to an output manner; and use each of the at least two pieces of audio sub-data as the target audio data, to separately perform data processing on audio sub-data in different output manners.

This embodiment of the present application further provides a terminal. The terminal includes a memory and one or more programs. The one or more programs are stored in the memory and configured to be executed by one or more processors. The one or more programs contain instructions used for performing the following operations:

obtaining target audio data corresponding to a data processing approach before switching when it is detected that the data processing approach needs to be switched; performing data processing on the target audio data by using a first audio data processing approach corresponding to the data processing approach before switching, to obtain target processing data processed using the first audio data processing approach; performing data processing on the target audio data by using a second audio data processing approach corresponding to the data processing approach after switching, to obtain target processing data processed using the second audio data processing approach; and determining output audio data to be played at the terminal during the real-time window, so that sound effects that can be achieved by the determined output audio data and expected target output audio data are consistent.

Further, the terminal may further include other instructions used for implementing the foregoing data processing method.

In the data processing method and the terminal thereof in the embodiments of the present application, target audio data corresponding to a data processing approach before switching is obtained, and data processing is separately performed on the target audio data by using a first audio data processing approach and a second audio data processing approach that correspond to the data processing approach before switching and after switching, to correspondingly obtain target processing data processed using the first audio data processing approach and target processing data processed using the second audio data processing approach, so that output audio data is corresponding to the target audio data is determined according to the target processing data processed using the first audio data processing approach and the target processing data processed using the second audio data processing approach, so that sound effects that can be achieved by the determined output audio data and expected target output audio data are consistent. In this way, a distortion problem caused by switching of the data processing approach is avoided.

In addition, in the embodiments of the present application, the target audio data is processed by using the first audio data processing approach and the second audio data processing approach that correspond to the data processing approach before switching and after switching, rather than separately processing the audio data before switching and after switching. Therefore, the method of the embodiments of the present application can implement on-line processing, and resolve an existing problem that a distortion phenomenon cannot be processed in an on-line manner.

DESCRIPTION OF EMBODIMENTS

To learn features and technical content of the present disclosure in more detail, implementations of the present disclosure are stated in detail below with reference to the accompanying drawings. The attached accompanying drawings are only for reference and are not intended to limit the present disclosure.

Figure 1:
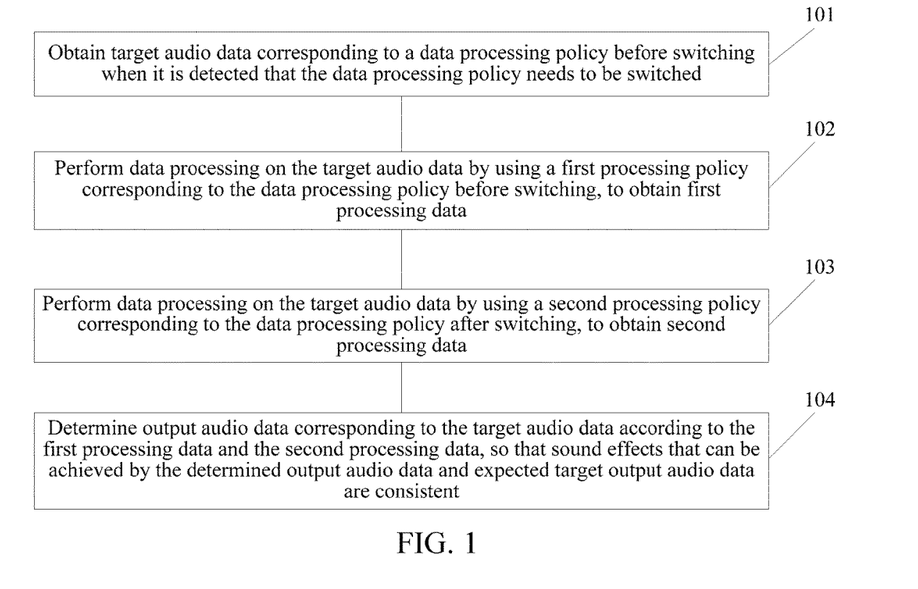
FIG. 1 is a schematic implementation flowchart of a data processing method according to some embodiments of the present application.

FIG. 1 is a first schematic implementation flowchart of a data processing method according to some embodiments of the present application. The method is applied to a terminal. As shown in FIG. 1, the method includes:

Operation 101: Obtain target audio data corresponding to a data processing approach before switching when it is detected that the data processing approach needs to be switched.

In an actual application, during audio output, a terminal obtains the target audio data corresponding to the data processing approach before switching and caches the target audio data when the terminal detects that the data processing approach needs to be switched, that is, the data processing approach needs to be switched from a first audio data processing approach to a second audio data processing approach. In this case, the target audio data may be specifically data corresponding to one frame of the data processing approach before switching.

Operation 102: Perform data processing on the target audio data by using a first audio data processing approach corresponding to the data processing approach before switching, to obtain target processing data processed using the first audio data processing approach. In some embodiments, the target audio data is obtained from an on-line resource (e.g., a music website) in real time. The terminal is configured to process the target audio data using a first audio data processing approach and play the processed target audio data at the terminal. The terminal chooses the first audio data processing approach among multiple audio data processing approaches available to the terminal in accordance with one or more characteristics extracted from the target audio data in real time, e.g., audio data encoding/ decoding schemes and power spectrum of the target audio data.

Operation 103: Perform data processing on the target audio data by using a second audio data processing approach corresponding to the data processing approach after switching, to obtain target processing data processed using the second audio data processing approach.

In an actual application, the terminal performs data processing on the data corresponding to one frame before switching, that is, the target audio data, by using the first audio data processing approach, to obtain target processing data processed using the first audio data processing approach. In addition, the terminal further performs data processing on the data corresponding to one frame before switching, that is, the target audio data, by using the second audio data processing approach, to obtain target processing data processed using the second audio data processing approach. That is, the target processing data processed using the first audio data processing approach and the target processing data processed using the second audio data processing approach are obtained by performing different data processing on the data corresponding to one frame before switching, that is, the target audio data. Further, because in this embodiment, data processing is separately performed on the same target audio data by using the processing policies corresponding to the data processing approach before and after switching, and the target audio data is the data corresponding to one frame before switching, in the method of this embodiment of the present application, on-line processing can be performed, that is, the audio data can be processed while being outputted. Therefore, a handling capacity of subsequent audio data processing is reduced, and user experience is improved. In this embodiment, the second audio data processing approach is different from the first audio data processing approach.

In some embodiments, while playing the processed target audio data at the terminal in real time, the terminal obtains an audio data processing approach transition instruction, the audio data processing approach transition instruction including a second audio data processing approach and a real-time window of switching from the first audio data processing approach to the second audio data processing approach. For example, the audio data processing approach transition instruction may be part of the target audio data obtained from the on-line source and extracted therefrom. Alternatively, the audio data processing approach transition instruction is obtained from meta data of the processed target audio data currently played at the terminal. For example, when the terminal plays the target audio data processed using the first audio data processing approach, it generates an audio fingerprint from the processed target audio data at the terminal and submits the audio fingerprint to a remote server for determining a length of the target audio data corresponding to the first audio data processing approach and, from which, a real-time window is determined as to when the target audio data is going to switch to the second audio data processing approach. Based on such information, the terminal determines a transition period of switching from the first audio data processing approach to the second audio data processing approach.

Herein, it should be noted that a sequence for performing operation 102 and operation 103 may be reserve, and operation 102 and operation 103 may be synchronously performed.

Operation 104: Determine output audio data according to the target processing data processed using the first audio data processing approach and the target processing data processed using the second audio data processing approach, so that sound effects that can be achieved by the determined output audio data and expected target output audio data are consistent.

In some embodiments, the terminal determines the output audio data to be played at the terminal during the real-time window by combining the target audio data processed using the first audio data processing approach during the real-time window and the target audio data processed using the second audio data processing approach during the real-time window. The output audio data to be played at the terminal is configured to have an average power of the target audio data processed using the first audio data processing approach and the target audio data processed using the second audio data processing approach during the real-time window. After the real-time window, the terminal processes the target audio data using the second first audio data processing approach and plays the processed target audio data at the terminal in real time.

In this way, in the data processing method in this embodiment of the present application, target audio data corresponding to a data processing approach before switching is obtained, and data processing is separately performed on the target audio data by using a first audio data processing approach and a second audio data processing approach that correspond to the data processing approach before switching and after switching, to correspondingly obtain target processing data processed using the first audio data processing approach and target processing data processed using the second audio data processing approach, so that output audio data is corresponding to the target audio data is determined according to the target processing data processed using the first audio data processing approach and the target processing data processed using the second audio data processing approach, so that sound effects that can be achieved by the determined output audio data and expected target output audio data are consistent. In this way, a distortion problem caused by switching of the data processing approach is avoided.

In addition, in the embodiments of the present application, the target audio data is processed by using the first audio data processing approach and the second audio data processing approach that correspond to the data processing approach before switching and after switching, rather than separately processing the audio data before switching and after switching. Therefore, the method of the embodiments of the present application can implement on-line processing, and resolve an existing problem that a distortion phenomenon cannot be processed in an on-line manner.

Based on the data processing method of some embodiments, this embodiment further describes in detail how to determine the output audio data according to the target processing data processed using the first audio data processing approach and the target processing data processed using the second audio data processing approach and that the sound effects that can be achieved by the determined output audio data and the expected target output audio data are consistent.

In this embodiment, the output audio data may be determined according to weighted values of the target processing data processed using the first audio data processing approach and the target processing data processed using the second audio data processing approach. Specifically, It is assumed that the target audio data is B, that is, the data corresponding to one frame of the data processing approach before switching is B, the target processing data processed using the first audio data processing approach obtained after performing data processing on B is $A_1$, and the target processing data processed using the second audio data processing approach obtained after performing data processing on B is $A_2$. In this case, the output audio data A may be determined according to the following formula: a sum $$A = k_1 \times A_1 + k_2 \times A_2.$$

Herein, coefficients $k_1$ and $k_2$ are both greater than 0 and less than 1. Preferably, the coefficients $k_1$ and $k_2$ are both greater than 0 and less than 1, and $k_1$ is less than $k_2$. More preferably, the coefficients $k_1$ and $k_2$ are both greater than 0 and less than 1, $k_1$ is less than $k_2$, and $k_1+k_2=1$ or $k_1^2+k_2^2=1$.

To further ensure that an entire output effect is not affected after the output audio data is placed back to an original audio data group, in this embodiment, a manner for gradually weakening the target processing data processed using the first audio data processing approach to lower a distortion risk is used and specifically includes:

performing attenuation processing on the target processing data processed using the first audio data processing approach, to obtain a first group of processing sub-data, where the first group of processing sub-data includes N pieces of first processing sub-data, the N pieces of first processing sub-data have a tendency to attenuate, data values of the N pieces of first processing sub-data are all less than or equal to a data value of the target processing data processed using the first audio data processing approach, and N is a positive integer greater than or equal to 2 that is determined according to a data length of the target audio data.

In a specific embodiment, the following manner is used to gradually weaken the target processing data processed using the first audio data processing approach and specifically includes:

multiplying the target processing data processed using the first audio data processing approach $A_1$ by N gradually decreasing coefficients $l_1, l_2, \ldots,$ and $l_N$, to obtain N pieces of first processing sub-data, which are sequentially $l_1 \times A_1, l_2 \times A_1, \ldots,$ and $l_N \times A_1$, where in this case, the N pieces of first processing sub-data are added to obtain the first group of processing sub-data $A_1[N]$, that is, $$A_1[N] = \sum_{i=1}^{N} (l_i \times A_1).$$

Herein, $l_1, l_2, \ldots,$ and $l_N$ are numbers greater than or equal to 0 and less than or equal to 1, and gradually decrease from $l_1$ and $l_2$ to $l_N$. N is a positive integer greater than or equal to 2 that is determined according to a data length of the target audio data. For example, N is equal to a data length of the target audio data B. $l_i$ may be specifically either of the following functions:

$$\frac{N-1-i}{N-1}, \cos\frac{i \times \pi}{4 \times (N-1)},$$

where i=1, 2, ..., or N.

To further ensure that an entire output effect is not affected after the output audio data is placed back to an original audio data group, in this embodiment, a manner for gradually enhancing the target processing data processed using the second audio data processing approach to lower a distortion risk is used and specifically includes:

performing enhancement processing on the target processing data processed using the second audio data processing approach, to obtain a second group of processing sub-data, where the second group of processing sub-data includes N pieces of second processing sub-data, the N pieces of second processing sub-data have a tendency to increase, data values of the N pieces of second processing sub-data are all less than or equal to a data value of the target processing data processed using the second audio data processing approach, and N is a positive integer greater than or equal to 2 that is determined according to a data length of the target audio data.

In another specific embodiment, the following manner is used to gradually enhance the target processing data processed using the second audio data processing approach and specifically includes:

multiplying the target processing data processed using the second audio data processing approach $A_2$ by N gradually increasing coefficients $m_1, m_2, \ldots,$ and $m_N$, to obtain N pieces of second processing sub-data, which are sequentially $m_1 \times A_2, m_2 \times A_2, \ldots,$ and $m_N \times A_2$, where in this case, the N pieces of second processing sub-data are added to obtain the second group of processing sub-data $A_2[N]$, that is, $$A_2[N] = \sum_{i=1}^{N} (m_i \times A_2).$$

Herein, $m_1, m_2, \ldots,$ and $m_N$ are numbers greater than or equal to 0 and less than or equal to 1, and gradually increase from $m_1$ and $m_2$ to $m_N$. N is a positive integer greater than or equal to 2 that is determined according to a data length of the target audio data. For example, N is equal to a data length of the target audio data B. $m_i$ may be specifically either of the following functions:

$$\frac{i}{N-1}, \sin\frac{i \times \pi}{4 \times (N-1)},$$

where $i=1, 2, \ldots,$ or N.

Herein, after the target processing data processed using the first audio data processing approach is processed by using the foregoing gradually weakening manner, and the target processing data processed using the second audio data processing approach is processed by using the foregoing gradually enhancing manner, in this case, operation 104 of the determining output audio data to be played at the terminal during the real-time window in some embodiments may be specifically:

determining the output audio data A corresponding to the target audio data according to the first group of processing sub-data $A_1[N]$ and the second group of processing sub-data $A_2[N]$.

Herein, it should be noted that in an actual application, after the target processing data processed using the first audio data processing approach is processed only by using the foregoing gradually weakening manner, the final output audio data A is determined according to the obtained first group of processing sub-data $A_1[N]$ and target processing data processed using the second audio data processing approach $A_2$. Alternatively, the target processing data processed using the second audio data processing approach is processed only using the foregoing gradually enhancing manner, and the final output audio data A is determined according to the obtained second group of processing sub-data $A_2[N]$. alternatively, the target processing data processed using the first audio data processing approach is processed by using the foregoing gradually weakening manner, and the target processing data processed using the second audio data processing approach is processed by using the foregoing gradually enhancing manner, and the final output audio data A is determined according to the first group of processing sub-data $A_1[N]$ and the second group of processing sub-data $A_2[N]$ that are obtained after processing. The foregoing selection manners may be determined according to actual requirements.

In addition, functions about $l_i$ and $m_i$ provided in this embodiment are used only for explaining this embodiment of the present application but are not intended to limit this embodiment of the present application. In an actual application, any of functions satisfying all the foregoing functions may be selected. For example, $l_i$ is a decreasing function, $m_i$ is an increasing function, and $l_i + m_i = 1$ or $l_i^2 + m_i^2 = 1$.

Figure 2:
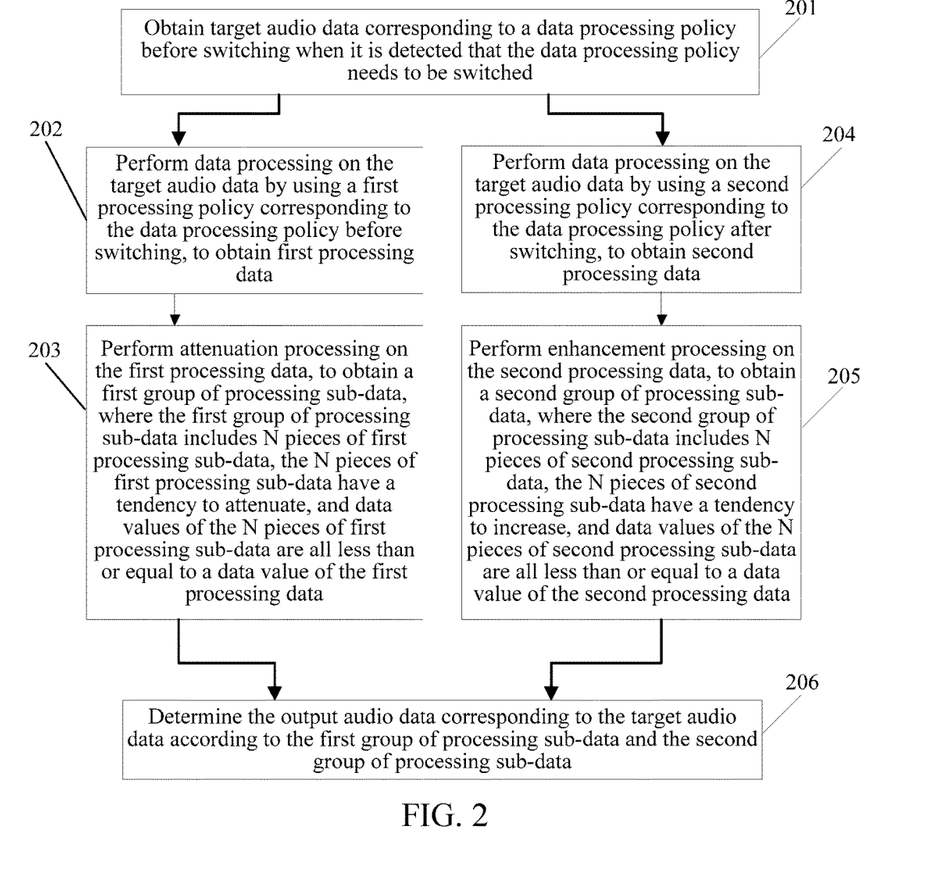
FIG. 2 is a schematic implementation flowchart of a data processing method according to some embodiments of the present application.

This embodiment of the present application is further described in detail by using a specific implementation process:

FIG. 2 is a second schematic implementation flowchart of a data processing method according to some embodiments of the present application. The method is applied to a terminal. As shown in FIG. 2, the method includes:

Operation 201: Obtain target audio data corresponding to a data processing approach before switching when it is detected that the data processing approach needs to be switched.

Operation 202: Perform data processing on the target audio data by using a first audio data processing approach corresponding to the data processing approach before switching, to obtain target processing data processed using the first audio data processing approach.

Operation 203: Perform attenuation processing on the target processing data processed using the first audio data processing approach, to obtain a first group of processing sub-data, where the first group of processing sub-data includes N pieces of first processing sub-data, the N pieces of first processing sub-data have a tendency to attenuate, data values of the N pieces of first processing sub-data are all less than or equal to a data value of the target processing data processed using the first audio data processing approach, and N is a positive integer greater than or equal to 2 that is determined according to a data length of the target audio data.

Operation 204: Perform data processing on the target audio data by using a second audio data processing approach corresponding to the data processing approach after switching, to obtain target processing data processed using the second audio data processing approach.

Herein, a sequence for performing operation 202 and operation 204 may be reserve, and operation 202 and operation 204 may be synchronously performed.

Operation 205: Perform enhancement processing on the target processing data processed using the second audio data processing approach, to obtain a second group of processing sub-data, where the second group of processing sub-data includes N pieces of second processing sub-data, the N pieces of second processing sub-data have a tendency to increase, and data values of the N pieces of second processing sub-data are all less than or equal to a data value of the target processing data processed using the second audio data processing approach.

Operation 206: Determine the output audio data according to the first group of processing sub-data and the second group of processing sub-data.

In this way, in the data processing method in this embodiment of the present application, target audio data corresponding to a data processing approach before switching is obtained, and data processing is separately performed on the target audio data by using a first audio data processing approach and a second audio data processing approach that correspond to the data processing approach before switching and after switching, to correspondingly obtain target processing data processed using the first audio data processing approach and target processing data processed using the second audio data processing approach, so that output audio data is corresponding to the target audio data is determined according to the target processing data processed using the first audio data processing approach and the target processing data processed using the second audio data processing approach, so that sound effects that can be achieved by the determined output audio data and expected target output audio data are consistent. In this way, a distortion problem caused by switching of the data processing approach is avoided.

In addition, in the embodiments of the present application, the target audio data is processed by using the first audio data processing approach and the second audio data processing approach that correspond to the data processing approach before switching and after switching, rather than separately processing the audio data before switching and after switching. Therefore, the method of the embodiments of the present application can implement on-line processing, and resolve an existing problem that a distortion phenomenon cannot be processed in an on-line manner.

Some Embodiments

Figure 3:
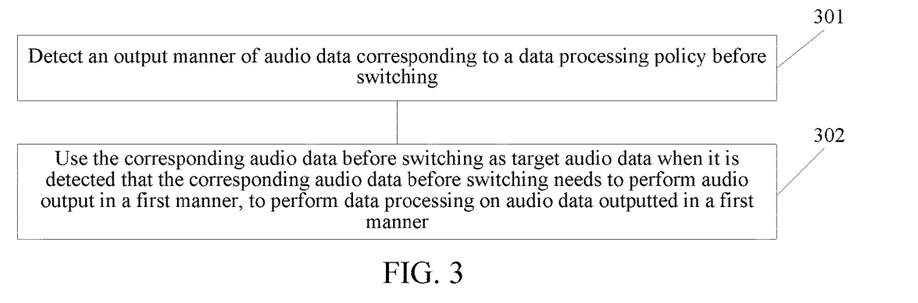
FIG. 3 is a schematic implementation flowchart of a data processing method according to some embodiments of the present application.

Based on the data processing method in some embodiments, in this embodiment, as shown in FIG. 3, the method further includes:

Operation 301: Detect an output manner of audio data corresponding to the data processing approach before switching.

Operation 302: Use the corresponding audio data before switching as the target audio data when it is detected that the corresponding audio data before switching needs to perform audio output in a first manner, to perform data processing on audio data outputted in the first manner.

In an actual application, the performing audio output in a first manner may be specifically performing audio output in a left channel or right channel manner. In this case, the corresponding audio data before switching that is outputted in the left channel or right channel manner is used as the target audio data, and processing is performed according to the data processing method in some embodiments.

Figure 4:
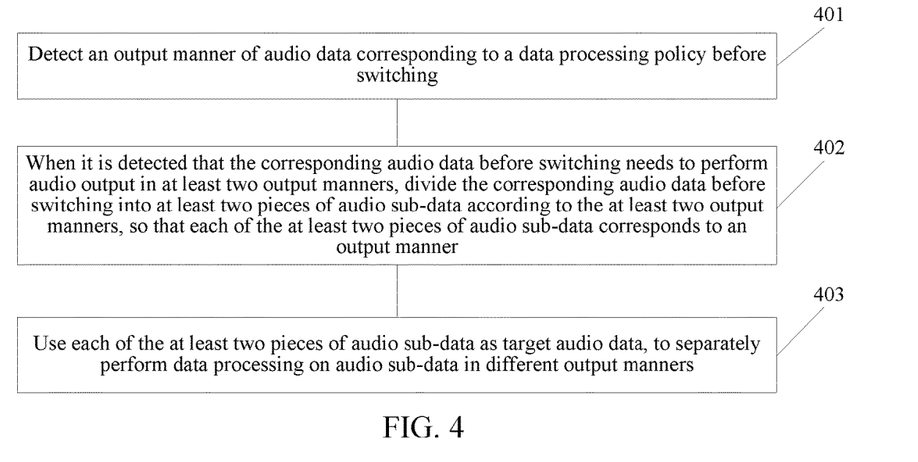
FIG. 4 is a schematic implementation flowchart of a data processing method according to some embodiments of the present application.

Further, as shown in FIG. 4, the method further includes:

Operation 401: Detect an output manner of audio data corresponding to the data processing approach before switching.

The output manner refers to whether the audio data is outputted in a single-channel manner, in a dual-channel manner, or in a multi-channel manner. If the audio data is outputted in the dual-channel manner, the dual-channel manner may include a left channel output manner and a right channel output manner. In different output scenarios, the output manner may also be a surround stereo sound output manner and the like. In this case, two or more channels may be involved to synchronously perform audio output.

Operation 402: When it is detected that the corresponding audio data before switching needs to perform audio output in at least two output manners, divide the corresponding audio data before switching into at least two pieces of audio sub-data according to the at least two output manners, so that each of the at least two pieces of audio sub-data corresponds to an output manner. For example, the audio sub-data corresponds to the output manners one to one.

Operation 403: Use each of the at least two pieces of audio sub-data as the target audio data, to separately perform data processing on audio sub-data in different output manners.

In a specific embodiment, two output manners are used as an example. The two output manners are respectively a first manner and a second manner. Specifically, audio data corresponding to a data processing approach before switching may include data that performs audio output in the first manner, for example, first audio sub-data, and also include data performs audio output in the second manner, for example, second audio sub-data. Assuming that the first manner is a left channel output manner, and the second manner is a right channel output manner, in this case, the terminal needs to determine the first audio sub-data and the second audio sub-data in the corresponding audio data before switching, separately uses the first audio sub-data and the second audio sub-data as target audio data, and separately processes the first audio sub-data and the second audio sub-data according to the data processing method in some embodiments. The first audio sub-data performs audio output in the first manner, and the second audio sub-data performs audio output in the second manner.

Figure 5:
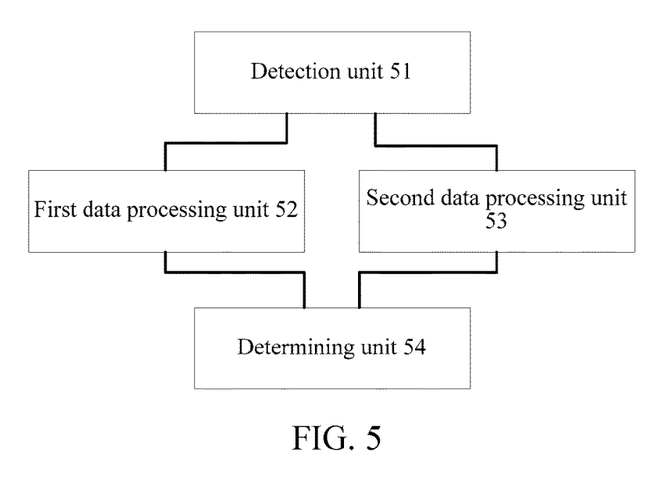
FIG. 5 is a schematic structural diagram of a terminal according to some embodiments of the present application.

FIG. 5 is a schematic structural diagram of a terminal according to some embodiments of the present application. As shown in FIG. 5, the terminal includes:

a detection unit 51, configured to obtain target audio data corresponding to a data processing approach before switching when it is detected that the data processing approach needs to be switched;

a first data processing unit 52, configured to perform data processing on the target audio data by using a first audio data processing approach corresponding to the data processing approach before switching, to obtain target processing data processed using the first audio data processing approach;

a second data processing unit 53, configured to perform data processing on the target audio data by using a second audio data processing approach corresponding to the data processing approach after switching, to obtain target processing data processed using the second audio data processing approach; and a determining unit 54, configured to determine output audio data according to the target processing data processed using the first audio data processing approach and the target processing data processed using the second audio data processing approach, so that sound effects that can be achieved by the determined output audio data and expected target output audio data are consistent.

In this embodiment, the first data processing unit 52 is further configured to perform attenuation processing on the target processing data processed using the first audio data processing approach, to obtain a first group of processing sub-data, where the first group of processing sub-data includes N pieces of first processing sub-data, the N pieces of first processing sub-data have a tendency to attenuate, data values of the N pieces of first processing sub-data are all less than or equal to a data value of the target processing data processed using the first audio data processing approach, and N is a positive integer greater than or equal to 2 that is determined according to a data length of the target audio data.

In this embodiment, the second data processing unit 53 is further configured to perform enhancement processing on the target processing data processed using the second audio data processing approach, to obtain a second group of processing sub-data, where the second group of processing sub-data includes N pieces of second processing sub-data, the N pieces of second processing sub-data have a tendency to increase, and data values of the N pieces of second processing sub-data are all less than or equal to a data value of the target processing data processed using the second audio data processing approach.

In this embodiment, the determining unit 54 is further configured to determine the output audio data according to the first group of processing sub-data and the second group of processing sub-data.

In this embodiment, the detection unit 51 is further configured to: detect an output manner of audio data corresponding to the data processing approach before switching; and use the corresponding audio data before switching as the target audio data when it is detected that the corresponding audio data before switching needs to perform audio output in a first manner, to perform data processing on audio data outputted in the first manner.

In this embodiment, the detection unit 51 is further configured to: detect an output manner of audio data corresponding to the data processing approach before switching; when it is detected that the corresponding audio data before switching needs to perform audio output in at least two output manners, divide the corresponding audio data before switching into at least two pieces of audio sub-data according to the at least two output manners, so that each of the at least two pieces of audio sub-data corresponds to an output manner; and use each of the at least two pieces of audio sub-data as the target audio data, to separately perform data processing on audio sub-data in different output manners.

A person skilled in the art should understand that functions of processing units in the terminal in this embodiment of the present application may be understood with reference to related descriptions of the foregoing data processing method, and processing units in the terminal in this embodiment of the present application may be implemented by implementing an analog circuit having the functions in this embodiment of the present application or may be implemented by running software having the functions in this embodiment of the present application on an intelligent terminal.

In this embodiment, the detection unit 51, the first data processing unit 52, the second data processing unit 53, and the determining unit 54 may all be run on the terminal or may be implemented by a central processing unit (CPU) located on the terminal, a micro processing unit (MPU), a digital signal processor (DSP), or a field programmable gate array (FPGA).

In several embodiments provided in this application, it should be understood that the disclosed device and method can be implemented in other manners. The above-described device embodiments are merely schematic. For example, division of the units is merely division of logic functions and may be another division manner during actual implementation. For example, multiple units or components may be combined or may be integrated into another system, or some features may be omitted or not be executed. In addition, mutual coupling, direct coupling, or communication connection between the displayed or discussed constituent parts may be indirect coupling or communication connection by means of some interfaces, devices, or units and may be electric, mechanical, or of another form.

The foregoing units described as separate components may be or may not be physically separated. Components displayed as units may be or may not be physical units, and may be located in one place or may be distributed on multiple network units. An objective of the solutions of this embodiment may be implemented by selecting some or all of the units according to actual needs.

In addition, the functional modules in the embodiments of the present application may be integrated into one processing unit, or each of the units may be used a unit alone, or two or more units may be integrated into one unit. The integrated units may be implemented in the form of hardware, or may be implemented in the form of a hardware and software functional unit.

A person of ordinary skill in the art may understand that all or some of the operations of the foregoing method embodiments may be implemented by using hardware relevant to a program instruction. The program may be stored in a computer readable storage medium. When being executed, the program executes operations of the foregoing method embodiments. The storage medium includes: various media capable of storing program code such as a mobile storage device, a read only memory (ROM, Read Only Memory), a random access memory (RAM, Random Access Memory), a magnetic disk, or an optical disc.

Alternatively, if the foregoing integrated units in the present disclosure are implemented in a form of a software functional module and are sold or used as an independent product, the units can also be stored in a computer readable storage medium. Based on such an understanding, the technical solutions of the present application essentially or the part contributing to the existing technology may be implemented in a form of a software product. The computer software product is stored in a storage medium and includes several instructions for instructing a computer device (which may be a personal computer, a server, a network device, or the like) to perform all or a part of the methods described in the embodiments of the present application. The foregoing storage medium includes: any medium that can store program code, such as a removable storage device, a read only memory (ROM, Read Only Memory), a random access memory (RAM, Random Access Memory), a magnetic disk, or an optical disc.

Figure 6:
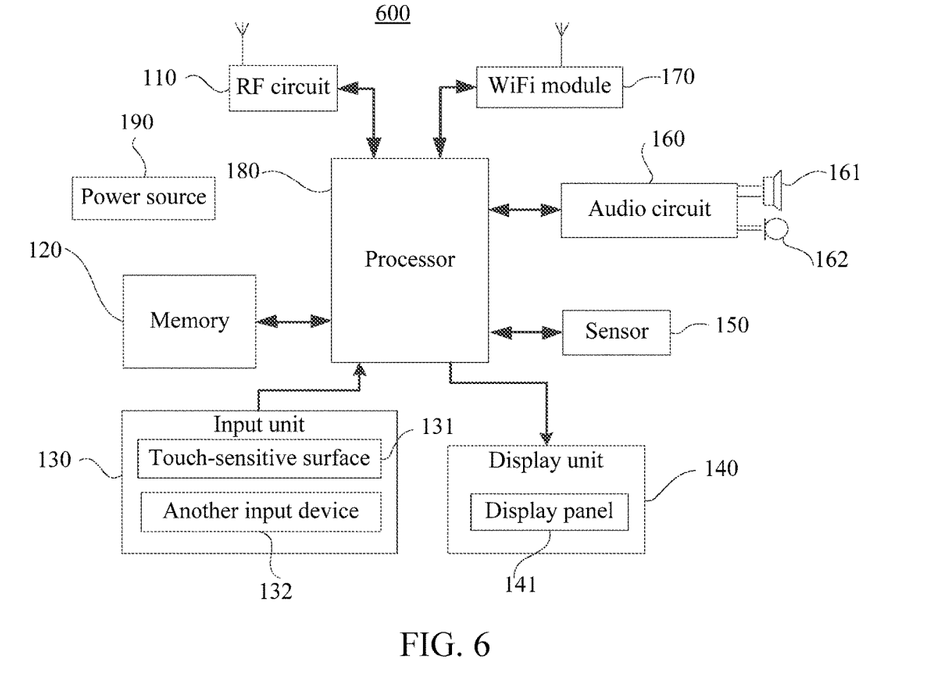
FIG. 6 is a schematic structural diagram of a terminal according to some embodiments of the present application.

This embodiment provides a terminal, and the terminal may be configured to perform the data processing method provided in the foregoing embodiments. Referring to FIG. 6, a terminal 600 includes:

A terminal 600 may include components such as an RF (Radio Frequency, radio frequency) circuit 110, a memory 120 including one or more computer readable storage media, an input unit 130, a display unit 140, a sensor 150, an audio circuit 160, a WiFi (Wireless Fidelity, wireless fidelity) module 170, a processor 180 including one or more processing cores, and a power source 190. A person skilled in the art would understand that the terminal structure shown in FIG. 6 does not impose a limitation to the terminal and may include components more or less than shown ones, or a combination of some components, or different component arrangements.

The RF circuit 110 may be configured to receive and send signals during an information receiving and sending process or a call process. Particularly, after the RF circuit 610 receives downlink information from a base station, the RF circuit 610 delivers the downlink information to one or more processors 180 for processing, and sends related uplink data to the base station. Usually, the RF circuit 110 includes, but is not limited to, an antenna, at least one amplifier, a turner, one or more oscillators, a subscriber identity module (SIM) card, a transceiver, a coupler, an LNA (Low Noise Amplifier, low noise amplifier), a duplexer, and the like. In addition, the RF circuit 110 may also communicate with a network and another device by wireless communication. The wireless communication may use any communications standard or protocol, which includes, but is not limited to, GSM (Global System of Mobile Communication, global system of mobile communication), GPRS (General Packet Radio Service, general packet radio service), CDMA (Code Division Multiple Access, code division multiple access), WCDMA (Wideband Code Division Multiple Access, wideband code division multiple access), a LTE (Long Term Evolution, long term evolution), emails, SMS (Short Messaging Service, short messaging service), and the like.

The memory 120 may be configured to store a software program and modules; the processor 180 executes various functional applications and data processing by running the software program and modules stored in the memory 120. The memory 120 may mainly include a program storage area and a data storage area, where the program storage area may store an operating system, an application (such as a voice playing function and an image playing function) required by at least one function, and the like; the data storage area may store data (such as audio data and a telephone book) created according to using of the terminal 600 and the like. In addition, the memory 120 may include a high speed random access memory, and may further include a non-transitory computer readable storage medium, such as at least one magnetic disk storage device, a flash memory, or another volatile solid-state storage device. Correspondingly, the memory 120 may further include a memory controller, to provide accesses of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131 may also be referred to as a touchscreen or a touch panel, and may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 600. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 6, the touch-sensitive surface 131 and the display panel 141 are used as two separate components to implement input and output functions, in some embodiments, the touch-sensitive surface 131 and the display panel 141 may be integrated to implement the input function and output functions.

The terminal 600 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 600 is moved to the ear. As one type of motion sensor, a gravity acceleration sensor may detect magnitude of accelerations at various directions (which generally are tri-axial), may detect magnitude and a direction of the gravity when static, and may be configured to identify an application of a mobile phone gesture (such as switchover between horizontal and vertical screens, a related game, and gesture calibration of a magnetometer), a related function of vibration identification (such as a pedometer and a knock). Other sensor, such as a gyroscope, a barometer, a hygrometer, a thermometer, and an infrared sensor, which may be configured in the terminal 600 are not further described herein.

The audio circuit 160, a speaker 161, and a microphone 162 may provide audio interfaces between the user and the terminal 600. The audio circuit 160 may transmit, to the speaker 161, a received electric signal converted from received audio data. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 600.

WiFi belongs to a short distance wireless transmission technology. The terminal device 600 may help a user to receive and send an email, browse a web page, and access stream media, and the like by using the WiFi module 170, which provides wireless broadband Internet access for the user. Although FIG. 6 shows the WiFi module 170, it may be understood that the WiFi module 170 does not belong to a necessary constitution of the terminal 600, and can be ignored according to demands without changing the scope of the essence of the present disclosure.

The processor 180 is a control center of the terminal 600, and connects to various parts of the terminal device by using various interfaces and lines. By running or executing the software program and/or module stored in the memory 120, and invoking data stored in the memory 120, the processor 180 performs various functions and data processing of the terminal 600, thereby performing overall monitoring on the mobile phone. Optionally, the processor 180 may include one or more processing cores. Preferably, the processor 180 may integrate an application processor and a modem processor. The application processor mainly processes an operating system, a user interface, an application, and the like, and the modem processor mainly processes wireless communication. It may be understood that the modem processor may not be integrated on the processor 180.

The terminal 600 further includes the power source 190 (such as a battery) for supplying power to the components. Preferably, the power source may logically connect to the processor 180 by using a power source management system, thereby implementing functions, such as charging, discharging, and power consumption management, by using the power source management system. The power source 190 may further include one or more of any component such as a direct current or alternating current power source, a re-charging system, a power failure detection circuit, a power source converter or inverter, and a power source state indicator.

Although not shown in the figure, the terminal device 600 may further include a camera, a Bluetooth module, and the like, which are not further described herein. Specifically, in this embodiment, the display unit of the terminal is a touchscreen display, and the terminal further includes a memory and one or more programs. The one or more programs are stored in the memory and configured to be executed by one or more processors. The one or more programs contain instructions used for performing the following operations:

obtaining target audio data corresponding to a data processing approach before switching when it is detected that the data processing approach needs to be switched; performing data processing on the target audio data by using a first audio data processing approach corresponding to the data processing approach before switching, to obtain target processing data processed using the first audio data processing approach; performing data processing on the target audio data by using a second audio data processing approach corresponding to the data processing approach after switching, to obtain target processing data processed using the second audio data processing approach; and determining output audio data to be played at the terminal during the real-time window, so that sound effects that can be achieved by the determined output audio data and expected target output audio data are consistent.

In another embodiment, the one or more programs further contain instructions used for performing the following operations: performing attenuation processing on the target processing data processed using the first audio data processing approach, to obtain a first group of processing sub-data, where the first group of processing sub-data includes N pieces of first processing sub-data, the N pieces of first processing sub-data have a tendency to attenuate, data values of the N pieces of first processing sub-data are all less than or equal to a data value of the target processing data processed using the first audio data processing approach, and N is a positive integer greater than or equal to 2 that is determined according to a data length of the target audio data.

In another embodiment, the one or more programs further contain instructions used for performing the following operations: performing enhancement processing on the target processing data processed using the second audio data processing approach, to obtain a second group of processing sub-data, where the second group of processing sub-data includes N pieces of second processing sub-data, the N pieces of second processing sub-data have a tendency to increase, and data values of the N pieces of second processing sub-data are all less than or equal to a data value of the target processing data processed using the second audio data processing approach.

In another embodiment, the one or more programs further contain instructions used for performing the following operations: determining the output audio data according to a linear summation of the first group of processing sub-data and the second group of processing sub-data.

In another embodiment, the one or more programs further contain instructions used for performing the following operations: detecting an output manner of audio data corresponding to the data processing approach before switching; and using the corresponding audio data before switching as the target audio data when it is detected that the corresponding audio data before switching needs to perform audio output in a first manner, to perform data processing on audio data outputted in the first manner.

In another embodiment, the one or more programs further contain instructions used for performing the following operations: detecting an output manner of audio data corresponding to the data processing approach before switching; when it is detected that the corresponding audio data before switching needs to perform audio output in at least two output manners, dividing the corresponding audio data before switching into at least two pieces of audio sub-data according to the at least two output manners, so that each of the at least two pieces of audio sub-data corresponds to an output manner; and using each of the at least two pieces of audio sub-data as the target audio data, to separately perform data processing on audio sub-data in different output manners.

The foregoing descriptions are merely specific implementation manners of the present application, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure should be subject to the protection scope of the claims.

What is claimed is:

1. A data processing method performed at a terminal having one or more processors and memory storing one or more programs to be executed by the one or more processors, the method comprising:

obtaining, in real time, target audio data from an on-line source;

processing the target audio data using a first audio data processing approach and playing the processed target audio data at the terminal;

while playing the processed target audio data at the terminal:

obtaining an audio data processing approach transition instruction, the audio data processing approach transition instruction including a second audio data processing approach and a real-time window of switching from the first audio data processing approach to the second audio data processing approach;

in response to the audio data processing approach transition instruction, processing the target audio data received in the real-time window using the first audio data processing approach and the second audio data processing approach separately; and determining output audio data to be played at the terminal during the real-time window by combining the target audio data processed using the first audio data processing approach during the real-time window and the target audio data processed using the second audio data processing approach during the real-time window.

2. The method according to claim 1, wherein the operation of combining the target audio data processed using the first audio data processing approach during the real-time window and the target audio data processed using the second audio data processing approach during the real-time window further comprises:

performing attenuation processing on the target processing data processed using the first audio data processing approach, to obtain a first group of processing sub-data, wherein the first group of processing sub-data comprises N pieces of first processing sub-data, the N pieces of first processing sub-data have a tendency to attenuate, data values of the N pieces of first processing sub-data are all less than or equal to a data value of the target processing data processed using the first audio data processing approach, and N is a positive integer greater than or equal to 2 that is determined according to a data length of the target audio data.

3. The method according to claim 2, wherein the operation of combining the target audio data processed using the first audio data processing approach during the real-time window and the target audio data processed using the second audio data processing approach during the real-time window further comprises:

performing enhancement processing on the target processing data processed using the second audio data processing approach, to obtain a second group of processing sub-data, wherein the second group of processing sub-data comprises N pieces of second processing sub-data, the N pieces of second processing sub-data have a tendency to increase, and data values of the N pieces of second processing sub-data are all less than or equal to a data value of the target processing data processed using the second audio data processing approach.

4. The method according to claim 3, wherein the operation of determining output audio data to be played at the terminal during the real-time window comprises:

determining the output audio data according to a linear summation of the first group of processing sub-data and the second group of processing sub-data.

5. The method according to claim 1, wherein the output audio data to be played at the terminal has an average power of the target audio data processed using the first audio data processing approach and the target audio data processed using the second audio data processing approach during the real-time window.

6. The method according to claim 1, further comprising:

after the real-time window, processing the target audio data using the second first audio data processing approach and playing the processed target audio data at the terminal.

7. The method according to claim 1, wherein the first audio data processing approach is chosen among multiple audio data processing approaches in accordance with one or more characteristics extracted from the target audio data in real time.

8. The method according to claim 1, wherein the audio data processing approach transition instruction is extracted from the target audio data obtained from the on-line source.

9. The method according to claim 1, wherein the audio data processing approach transition instruction is obtained from meta data of the processed target audio data currently played at the terminal.

10. A terminal, comprising:

one or more processors;

memory; and one or more programs stored in the memory that, when executed by the one or more processors, cause the terminal to perform a plurality of operations including:

obtaining, in real time, target audio data from an on-line source;

processing the target audio data using a first audio data processing approach and playing the processed target audio data at the terminal;

while playing the processed target audio data at the terminal:

obtaining an audio data processing approach transition instruction, the audio data processing approach transition instruction including a second audio data processing approach and a real-time window of switching from the first audio data processing approach to the second audio data processing approach;

in response to the audio data processing approach transition instruction, processing the target audio data received in the real-time window using the first audio data processing approach and the second audio data processing approach separately; and determining output audio data to be played at the terminal during the real-time window by combining the target audio data processed using the first audio data processing approach during the real-time window and the target audio data processed using the second audio data processing approach during the real-time window.

11. The terminal according to claim 10, wherein the operation of combining the target audio data processed using the first audio data processing approach during the real-time window and the target audio data processed using the second audio data processing approach during the real-time window further comprises:

performing attenuation processing on the target processing data processed using the first audio data processing approach, to obtain a first group of processing sub-data, wherein the first group of processing sub-data comprises N pieces of first processing sub-data, the N pieces of first processing sub-data have a tendency to attenuate, data values of the N pieces of first processing sub-data are all less than or equal to a data value of the target processing data processed using the first audio data processing approach, and N is a positive integer greater than or equal to 2 that is determined according to a data length of the target audio data.

12. The terminal according to claim 11, wherein the operation of combining the target audio data processed using the first audio data processing approach during the real-time window and the target audio data processed using the second audio data processing approach during the real-time window further comprises:

performing enhancement processing on the target processing data processed using the second audio data processing approach, to obtain a second group of processing sub-data, wherein the second group of processing sub-data comprises N pieces of second processing sub-data, the N pieces of second processing sub-data have a tendency to increase, and data values of the N pieces of second processing sub-data are all less than or equal to a data value of the target processing data processed using the second audio data processing approach.

13. The terminal according to claim 12, wherein the operation of determining output audio data to be played at the terminal during the real-time window comprises:

determining the output audio data according to a linear summation of the first group of processing sub-data and the second group of processing sub-data.

14. The terminal according to claim 10, wherein the output audio data to be played at the terminal has an average power of the target audio data processed using the first audio data processing approach and the target audio data processed using the second audio data processing approach during the real-time window.

15. The terminal according to claim 10, wherein the plurality of operations further comprise:

after the real-time window, processing the target audio data using the second first audio data processing approach and playing the processed target audio data at the terminal.

16. A non-transitory computer readable storage medium storing a plurality of operations that are configured to be executed by one or more processors of a terminal, the plurality of operations including:

obtaining, in real time, target audio data from an on-line source;

processing the target audio data using a first audio data processing approach and playing the processed target audio data at the terminal;

while playing the processed target audio data at the terminal:

obtaining an audio data processing approach transition instruction, the audio data processing approach transition instruction including a second audio data processing approach and a real-time window of switching from the first audio data processing approach to the second audio data processing approach;

in response to the audio data processing approach transition instruction, processing the target audio data received in the real-time window using the first audio data processing approach and the second audio data processing approach separately; and determining output audio data to be played at the terminal during the real-time window by combining the target audio data processed using the first audio data processing approach during the real-time window and the target audio data processed using the second audio data processing approach during the real-time window.

17. The non-transitory computer readable storage medium according to claim 16, wherein the operation of combining the target audio data processed using the first audio data processing approach during the real-time window and the target audio data processed using the second audio data processing approach during the real-time window further comprises:

performing attenuation processing on the target processing data processed using the first audio data processing approach, to obtain a first group of processing sub-data, wherein the first group of processing sub-data comprises N pieces of first processing sub-data, the N pieces of first processing sub-data have a tendency to attenuate, data values of the N pieces of first processing sub-data are all less than or equal to a data value of the target processing data processed using the first audio data processing approach, and N is a positive integer greater than or equal to 2 that is determined according to a data length of the target audio data.

18. The non-transitory computer readable storage medium according to claim 17, wherein the operation of combining the target audio data processed using the first audio data processing approach during the real-time window and the target audio data processed using the second audio data processing approach during the real-time window further comprises:

performing enhancement processing on the target processing data processed using the second audio data processing approach, to obtain a second group of processing sub-data, wherein the second group of processing sub-data comprises N pieces of second processing sub-data, the N pieces of second processing sub-data have a tendency to increase, and data values of the N pieces of second processing sub-data are all less than or equal to a data value of the target processing data processed using the second audio data processing approach.

19. The non-transitory computer readable storage medium according to claim 18, wherein the operation of determining output audio data to be played at the terminal during the real-time window comprises:

determining the output audio data according to a linear summation of the first group of processing sub-data and the second group of processing sub-data.

20. The non-transitory computer readable storage medium according to claim 16, wherein the output audio data to be played at the terminal has an average power of the target audio data processed using the first audio data processing approach and the target audio data processed using the second audio data processing approach during the real-time window.

* * * * *